United States Patent
Hayashi

(10) Patent No.: US 11,022,523 B2
(45) Date of Patent: Jun. 1, 2021

(54) MODE-DEPENDENT LOSS MEASUREMENT METHOD AND MEASUREMENT DEVICE

(71) Applicant: SUMITOMO ELECTRIC INDUSTRIES, LTD., Osaka (JP)

(72) Inventor: Tetsuya Hayashi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 341 days.

(21) Appl. No.: 15/923,062

(22) Filed: Mar. 16, 2018

(65) Prior Publication Data

US 2018/0202895 A1 Jul. 19, 2018

Related U.S. Application Data

(63) Continuation of application No. PCT/JP2016/088146, filed on Dec. 21, 2016.

(30) Foreign Application Priority Data

Mar. 4, 2016 (JP) .............................. JP2016-042209

(51) Int. Cl.
*G01M 11/00* (2006.01)
*G02B 6/02* (2006.01)
(Continued)

(52) U.S. Cl.
CPC .......... *G01M 11/337* (2013.01); *G01M 11/33* (2013.01); *G02B 6/02* (2013.01);
(Continued)

(58) Field of Classification Search
CPC ....... G01M 11/33; G01M 11/337; G02B 6/02; G02B 6/02014; G02B 6/02042; G02B 6/02266; G02B 6/2808; G02B 6/42
(Continued)

(56) References Cited

U.S. PATENT DOCUMENTS

2005/0225746 A1* 10/2005 Nishikawa ........... G01M 11/336
356/73.1
2007/0171399 A1* 7/2007 Froggatt .............. G01N 21/274
356/73.1
(Continued)

OTHER PUBLICATIONS

Fan, Shanhui, et al., "Principal modes in multimode waveguides," Optics Letters vol. 30, No. 2, Jan. 15, 2005, pp. 135-137.
(Continued)

*Primary Examiner* — Sunghee Y Gray
(74) *Attorney, Agent, or Firm* — Faegre Drinker Biddle & Reath LLP

(57) ABSTRACT

A present embodiment relates to a MDL measurement method and the like including a structure for enabling MDL measurement without increasing a processing load. The present embodiment sequentially executes, for N (≥2) spatial modes, light-input operation of inputting light of a predetermined intensity to an arbitrary spatial mode, and intensity measurement operation of measuring an output light intensity of each of the N spatial modes including the arbitrary spatial mode, to generate a transfer matrix relating to transmission loss in an optical fiber as a measurement target, and determine at least a linear value of MDL per unit fiber length by using each component value of the generated transfer matrix.

11 Claims, 10 Drawing Sheets

(51) Int. Cl.
  *G02B 6/28* (2006.01)
  *G02B 6/42* (2006.01)
(52) U.S. Cl.
  CPC ..... *G02B 6/02014* (2013.01); *G02B 6/02042* (2013.01); *G02B 6/02266* (2013.01); *G02B 6/2808* (2013.01); *G02B 6/42* (2013.01)
(58) Field of Classification Search
  USPC ...................................................... 356/73.1
  See application file for complete search history.

(56) References Cited

U.S. PATENT DOCUMENTS

| | | | | |
|---|---|---|---|---|
| 2007/0242270 | A1* | 10/2007 | Kelly | G01M 11/337 356/364 |
| 2013/0301998 | A1* | 11/2013 | Hayashi | G02B 6/02042 385/100 |
| 2014/0037289 | A1* | 2/2014 | Feder | H04B 10/50 398/55 |
| 2017/0299900 | A1* | 10/2017 | Montoya | H01S 3/005 |

OTHER PUBLICATIONS

Fountaine, Nicolas K., "Characterization of multi-mode fibers and devices for MIMO communications," Proc. of SPIE, vol. 9009, Dec. 24, 2013, p. 90090A-1-p. 90090A-8.

Randel, Sebastian, et al., "MIMO-Based Signal Processing for Mode-Multiplexed Transmission," IEEE Photonics Society Summer Topical Meeting Series, Jul. 9, 2012, pp. 181-182.

Yamamoto, Takashi, "Trends of Spatial Mode Division Multiplexing Transmission Technology," Journal of the ITU Association of Japan, vol. 46, No. 1, Jan. 2016, pp. 33-37, including partial English translation.

Winzer, Peter J., et al., "MIMO capacities and outage probabilities in spatially multiplexed optical transport systems," Opt. Express, vol. 19, No. 17, Aug. 2011, pp. 16680-16696.

Hirohiro Miyamoto, Hirokazu Takenouchi, "High-Density Spatial Multiplexing Optical Communication Technology aimed at realizing petabit-class transmission per second", NTT Technology Journal, vol. 26, No. 8, Aug. 2014, p. 52-p. 56.

* cited by examiner

MODE-DEPENDENT LOSS MEASUREMENT METHOD AND MEASUREMENT DEVICE

CROSS-REFERENCE TO RELATED APPLICATIONS

This application is a continuation application of PCT/JP2016/088146 claiming the benefit of priority of the Japanese Patent Application No. 2016-042209 filed on Mar. 4, 2016, the entire contents of which are incorporated herein by reference.

TECHNICAL FIELD

The present invention relates to a Mode-Dependent Loss (hereinafter referred to as "MDL") measurement method and a MDL measurement device for measuring MDL in a transmission medium applied to a mode division multiplex transmission system, and relates to an optical fiber that can be applied to the transmission medium for mode division multiplexing.

BACKGROUND ART

Non Patent Document 1 discloses that when Multi-Input/Multi-Output (hereinafter referred to as "MIMO") processing is performed in a mode division multiplex transmission system, transmission capacity during mode division multiplex transmission by a MIMO configuration decreases due to MDL of a transmission medium, and discloses an expression for calculating the MDL from a transfer matrix.

Non Patent Document 2 discloses results of analyzing MDL of a mode division multiplex transmission system in which a coupled Multi-Core Optical Fiber (hereinafter referred to as "MCF") is applied as a transmission medium, by using the expression disclosed in the above Non Patent Document 1 by MIMO processing. The analyzed MDL of the coupled MCF varies for each graph, but the MDL is approximately 0.06 dB/km$^{1/2}$ to 0.14 dB/km$^{1/2}$.

CITATION LIST

Non Patent Literature

Non Patent Document 1: P. J. Winzer and G J. Foschini, "MIMO capacities and outage probabilities in spatially multiplexed optical transport systems," Opt. Express, vol. 19, no. 17, pp. 16680-16696, August 2011.

Non Patent Document 2: S. Randel, C. Schmidt, R. Ryf, R. J. Essiambre, and P. J. Winzer, "MIMO-based signal processing for mode-multiplexed transmission," in IEEE Photonics Society Summer Topical Meeting Series, 2012, pp. 181-182, paper MC 4.1.

SUMMARY OF INVENTION

Technical Problem

As a result of examining the conventional technique, the inventor has found the following problems. That is, according to the above-described conventional technique, analysis by MIMO processing is necessary for measuring MDL, so that it is necessary to perform coherent detection of a plurality of, (number of spatial modes)×(number of polarization modes), signals, to predict a transfer matrix of a transmission line including time delay and wavelength dependency, and to perform singular value decomposition of the transfer matrix. For that reason, it has been necessary to perform complicated measurement and calculation, during MDL evaluation for an optical fiber for mode division multiplexing.

FIG. 1A is a diagram illustrating a schematic configuration of a general MDL measurement device in an optical fiber applied to a transmission medium for mode division multiplex transmission, and a MDL measurement device 100 illustrated in FIG. 1A includes: a transmission system 20 disposed on an input end 10a (first end) side of an optical fiber 10 as a measurement target; a reception system 30 disposed on an output end 10b (second end) side of an optical fiber 10; and a control device 40 configured to control the transmission system 20 via a transmission system control line (Including a data line) 25 and control the reception system 30 via a reception system control line (including a data line) 35. The control device 40 includes a calculation means 50 for calculating MDL of the optical fiber 10 by using observation data obtained from the reception system 30.

As illustrated in FIG. 2A, as an example, a transmission system 20A in a conventional MDL measurement device corresponding to the transmission system 20 in FIG. 1A, includes a Spatial-Division-Multiplexing (hereinafter referred to as "SDM") multiplexer 21, and N (≥2) In-phase/Quadrature (IQ) modulators 22. The N IQ modulators 22 are provided respectively to N (≥2) spatial channels #1 to #N in the optical fiber 10, and are controlled via control line (#1 to #N) 25 by the control device 40. The SDM multiplexer 21 inputs multiplexed light of modulated light from the N IQ modulators 22, from the input end 10a of the optical fiber 10 to the optical fiber 10.

Meanwhile, as illustrated in FIG. 2B, as an example, a reception system 30A in the conventional MDL measurement device corresponding to the reception system 30 in FIG. 1A, includes an SDM splitter 31, and N coherent receivers 32 (coherent receivers #1 to #N) provided respectively to the spatial channels #1 to #N in the optical fiber 10. Light outputted from the output end 10b of the optical fiber 10 is split into light beams of the respective spatial channels by the SDM splitter 31, and complex amplitude information of light received by a corresponding coherent receiver 32 is measured. The control device 40 takes in the complex amplitude information of each of the spatial channels #1 to #N via control line 35, and the calculation means 50 calculates the MDL in the optical fiber 10.

Specifically, as illustrated in FIG. 3, a conventional MDL measurement method performs: multiplexing and outputting of the modulated light for the number of spatial channels (step ST310); acquisition of the complex amplitude information for the number of spatial channels (step ST320); generation of an estimation matrix of a transfer matrix T relating to the complex amplitude (step ST330); and determination of a value of the MDL (step ST340), and main operation of the method will be described below.

In step ST310, in the transmission system 20A, the IQ modulators 22 individually generate (modulate with a known pilot signal) the modulated light for each of the N spatial channels #1 to #N, and the multiplexed light multiplexed by the SDM multiplexer 21 is inputted from the input end 10a to the optical fiber 10. In step ST320, the light outputted from the output end 10b of the optical fiber 10 is split by the SDM splitter 31, complex amplitude information of the light is acquired by the coherent receivers 32 provided respectively to the spatial channels #1 to #N, and the acquired complex amplitude information is sent to the control device 40 via the control line 35. In step ST330, the calculation means 50 of the control device 40 uses the known pilot signal and the complex amplitude information of the light propagating through the optical fiber 10 as the measurement target, to calculate the estimation matrix of the transfer matrix T relating to the complex amplitude. Here, calculation of the estimation matrix is performed by various methods such as Zero-Forcing estimation, least squares estimation, minimum norm solution, general/linear minimum mean square error estimation, maximum likelihood estimation, maximum ratio combining, subspace method, and compressed sensing. In step ST340, the calculation means 50 performs singular decomposition of the calculated estimation matrix, and determines a ratio between the maximum value and the minimum value of squares of singular values, as an estimated value of the MDL.

The present invention has been made to solve the above-described problem (necessity of performing complicated measurement and calculation), and it is an object of the present invention to provide a MDL measurement method and a MDL measurement device including a structure for enabling measurement of MDL of an optical fiber applied as a transmission line to a mode division multiplex transmission system without increasing a processing load, and an optical fiber applicable to the transmission medium for mode division multiplexing.

Solution to Problem

To solve the above-described problem, a MDL (mode-dependent loss) measurement method according to a present embodiment measures MDL of an optical fiber as a measurement target, the optical fiber having a first end and a second end opposite to the first end and enabling optical transmission in N (≥2) spatial modes between which a large mutual crosstalk occurs. Specifically, the MDL measurement method executes generation of a transfer matrix relating to transmission loss in the optical fiber from the first end to the second end, and determination of a linear value of MDL per unit fiber length. The transfer matrix is obtained by repeating, for each of the N spatial modes while changing the target spatial mode, light-input operation and intensity measurement operation, the light-input operation inputting light of a predetermined intensity, from the first end of the optical fiber, to an arbitrary target spatial mode, the intensity measurement operation measuring intensity of light of each of the N spatial modes including the target spatial mode, the light being outputted from the second end of the optical fiber in response to light-input to the target spatial mode. The linear value of the MDL per unit fiber length is given by a ratio obtained by dividing the maximum value of matrix elements constituting the transfer matrix by the minimum value of the matrix elements, or a ratio obtained by dividing the maximum value of eigenvalues or singular values of the transfer matrix by the minimum value of the eigenvalues or the singular values. Further, a decibel value [dB/(unit fiber length)$^{1/2}$] of the MDL per unit fiber length may be determined by multiplying a common logarithm of the linear value by ten.

Advantageous Effects of Invention

According to the present embodiment, the MDL of the transmission medium, that is, the transmission loss difference between the spatial modes can be measured without coherent detection or calculation of a MIMO coefficient in mode division multiplex transmission.

DESCRIPTION OF EMBODIMENTS

Figure 1A:
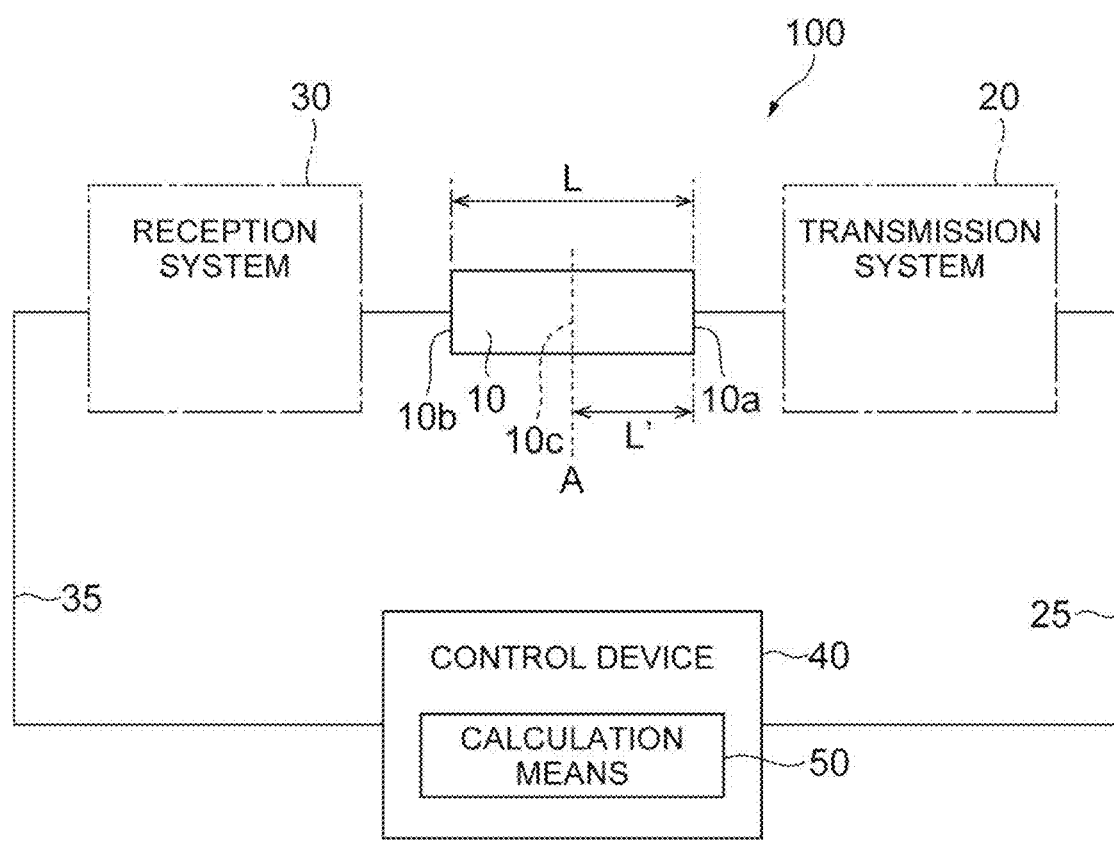
FIG. 1A is a diagram illustrating a schematic configuration of a general MDL measurement device in an optical fiber for mode division multiplex transmission.

Description of Embodiments of the Present Invention

First, contents of embodiments of the present invention will be individually listed and described.

(1) A mode-dependent loss measurement method (MDL measurement method) according to a present embodiment enables measurement of MDL of a transmission medium, that is, measurement of transmission loss difference between spatial modes, without coherent detection or calculation of a MIMO coefficient in mode division multiplex transmission. As its one aspect, the MDL measurement method measures MDL of an optical fiber as a measurement target, the optical fiber having a first end and a second end opposite to the first end and enabling optical transmission in N (≥2) spatial modes between which a large mutual crosstalk occurs. The MDL measurement method is particularly suitable for measurement of an optical fiber in which crosstalk is −10 dB or more in a fiber length during measurement, and also suitable for an optical fiber having a power coupling coefficient between spatial modes of 0.1 [km$^{-1}$] or more. Specifically, the MDL measurement method executes generation of a transfer matrix relating to transmission loss in the optical fiber from the first end to the second end, and determination of a linear value of MDL per unit fiber length. The transfer matrix is obtained by repeating, for each of the N spatial modes while changing the target spatial mode, light-input operation and intensity measurement operation, the light-input operation inputting light of a predetermined intensity, from the first end of the optical fiber, to an arbitrary target spatial mode, the intensity measurement operation measuring intensity of light of each of the N spatial modes including the target spatial mode, the light being outputted from the second end of the optical fiber in response to light-input to the target spatial mode. The linear value of the MDL per unit fiber length is given by a ratio obtained by dividing the maximum value of matrix elements constituting the transfer matrix by the minimum value of the matrix elements, or a ratio obtained by dividing the maximum value of eigenvalues or singular values of the transfer matrix by the minimum value of the eigenvalues or the singular values. Further, a decibel value $[dB/(\text{unit fiber length})^{1/2}]$ of the MDL per unit fiber length may be determined by multiplying a common logarithm of the linear value by ten.

The mode-dependent loss measurement device (MDL measurement device) according to the present embodiment includes a transmission system, a reception system, and a control device configured to control the transmission system and the reception system. The transmission system inputs the light of the predetermined intensity, from the first end of the optical fiber, to any of the N spatial modes. The reception system measures the intensity of the light of each of the N spatial modes, the light being outputted from the second end of the optical fiber. The control device controls the transmission system to input the light of the predetermined intensity, from the first end of the optical fiber, to the arbitrary target spatial mode, and controls the reception system to measure the intensity of the light of each of the N spatial modes including the target spatial mode, the light being outputted from the second end of the optical fiber in response to the light-input to the target spatial mode. In addition, the control device executes generation of the transfer matrix relating to the transmission loss in the optical fiber from the first end to the second end, and determination of the linear value of the MDL per unit fiber length, as described above. The control device may further determine the decibel value $[dB/(\text{unit fiber length})^{1/2}]$ of the MDL per unit fiber length from the linear value.

(2) As one aspect of the present embodiment, in a case where random coupling occurs between the spatial modes and the MDL $[dB/(km)^{1/2}]$ accumulates, the light-input operation by the transmission system preferably includes operation of inputting light of an intensity $P_i$ [mW], from the first end of an optical fiber having a fiber length $L_i$ [unit fiber length], to an i-th (i=1, 2, ..., N) spatial mode as the target spatial mode out of the N spatial modes. In addition, the intensity measurement operation by the reception system preferably includes operation of measuring the intensity of light of each of N spatial modes in which light intensity of an j-th (j=1, 2, ..., N) spatial mode is represented by $P_{ji}$ [mW], the light being outputted from the second end of the optical fiber in response to light-input to the i-th spatial mode. The control device controls the transmission system and the reception system to repeat the light-input operation and the intensity measurement operation for each of the N spatial modes while changing the target spatial mode, to generate a transfer matrix relating to transmission loss represented by the expression (1) as follows:

$$\begin{pmatrix} \left(\frac{P_{11}}{P_1}\right)^{\sqrt{\frac{1}{L_i}}} & \cdots & \left(\frac{P_{1i}}{P_i}\right)^{\sqrt{\frac{1}{L_i}}} & \cdots & \left(\frac{P_{1N}}{P_N}\right)^{\sqrt{\frac{1}{L_N}}} \\ \vdots & \ddots & \vdots & \ddots & \vdots \\ \left(\frac{P_{j1}}{P_1}\right)^{\sqrt{\frac{1}{L_i}}} & \cdots & \left(\frac{P_{ji}}{P_i}\right)^{\sqrt{\frac{1}{L_i}}} & \cdots & \left(\frac{P_{jN}}{P_N}\right)^{\sqrt{\frac{1}{L_N}}} \\ \vdots & \ddots & \vdots & \ddots & \vdots \\ \left(\frac{P_{N1}}{P_1}\right)^{\sqrt{\frac{1}{L_i}}} & \cdots & \left(\frac{P_{Ni}}{P_i}\right)^{\sqrt{\frac{1}{L_i}}} & \cdots & \left(\frac{P_{NN}}{P_N}\right)^{\sqrt{\frac{1}{L_N}}} \end{pmatrix}. \quad (1)$$

(3) In MDL measurement without a cutback as described above, influence of variation in connection loss at the first end appears in the light intensity $P_{ji}$ [mW] of the j-th spatial mode measured in response to the light-input to the i-th spatial mode. Therefore, as one aspect of the present embodiment, a configuration can be applied that eliminates the influence of variation in connection loss in the MDL measurement, by the cutback. Specifically, in the light-input operation by the transmission system, the light of the intensity $P_i$ [mW] is inputted, from the first end of the optical fiber having the fiber length $L_i$ [unit fiber length], to the i-th spatial mode as the target spatial mode out of the N spatial modes. The intensity measurement operation by the reception system includes first operation of measuring the intensity before the cutback, and second operation of measuring the intensity after the cutback. In the first operation, the intensity is measured of the light of each of the N spatial modes in which the light intensity of the j-th spatial mode is represented by $P_{ji}$ [mW], the light being outputted from the second end of the optical fiber in response to the light-input to the i-th spatial mode. In the second operation, first, a cutback part is prepared having the first end and a cutback length $L_i'$ ($<L_i$) [unit fiber length], obtained by cutting the optical fiber at a position of 1 [m] to 50 [m] from the first end while leaving the first end. Then, in response to the light-input to the i-th spatial mode, light intensity $P_i'$ [mW] is measured of the i-th spatial mode outputted from a third end opposite to the first end of the cutback part. The control device controls the transmission system and the reception system to repeat the light-input operation and the intensity measurement operation for each of the N spatial modes while changing the target spatial mode, to generate a transfer matrix relating to transmission loss represented by the expression (2) as follows:

$$\begin{pmatrix} \left(\frac{P_{11}}{P_1'}\right)^{\sqrt{\frac{1}{L_i}}} & \cdots & \left(\frac{P_{1i}}{P_i'}\right)^{\sqrt{\frac{1}{L_i}}} & \cdots & \left(\frac{P_{1N}}{P_N'}\right)^{\sqrt{\frac{1}{L_N}}} \\ \vdots & \ddots & \vdots & \ddots & \vdots \\ \left(\frac{P_{j1}}{P_1'}\right)^{\sqrt{\frac{1}{L_i}}} & \cdots & \left(\frac{P_{ji}}{P_i'}\right)^{\sqrt{\frac{1}{L_i}}} & \cdots & \left(\frac{P_{jN}}{P_N'}\right)^{\sqrt{\frac{1}{L_N}}} \\ \vdots & \ddots & \vdots & \ddots & \vdots \\ \left(\frac{P_{N1}}{P_1'}\right)^{\sqrt{\frac{1}{L_i}}} & \cdots & \left(\frac{P_{Ni}}{P_i'}\right)^{\sqrt{\frac{1}{L_i}}} & \cdots & \left(\frac{P_{NN}}{P_N'}\right)^{\sqrt{\frac{1}{L_N}}} \end{pmatrix}. \quad (2)$$

(4) The optical fiber according to the present embodiment enables an increase in transmission capacity in mode division multiplexing transmission of a MIMO configuration. As its one aspect, in the optical fiber, the MDL measured by the above-described MDL measurement method is sufficiently suppressed in a wavelength range of 1530 nm to 1565 nm or a wavelength range of 1460 nm to 1625 nm. Specifically, in the above wavelength range, the MDL is 0.02 dB/km$^{1/2}$ or less, or an average value of the MDL is 0.01 dB/km$^{1/2}$ or less.

(5) As one aspect of the present embodiment, the above optical fiber is preferably a coupled MCF (multi-core optical fiber). Specifically, as optical properties of the coupled MCF, a mode coupling coefficient is preferably 1 [m$^{-1}$] to 100 [m$^{-1}$] at a wavelength of 1550 nm. In the wavelength range of 1530 nm to 1565 nm or the wavelength range of 1460 nm to 1625 nm, the transmission loss at all mode excitation is preferably 0.20 dB/km or less, 0.18 dB/km or less, 0.16 dB/km or less, or 0.15 dB/km or less. A mode average of chromatic dispersion is preferably 16 ps/(nm·km) or more. With respect to light with a wavelength of 1550 nm of all spatial modes, bending loss is preferably 0.2 dB or less when the optical fiber is wound one turn around a mandrel having a diameter of 30 mm. With respect to the light with the wavelength of 1550 nm of all the spatial modes, bending loss at a diameter of 20 mm is preferably 20 dB/m or less. With respect to the light with the wavelength of 1550 nm of all the spatial modes, bending loss is preferably 0.5 dB or less when the optical fiber is wound 100 turns around a mandrel having a radius of 30 mm. Under external stress application, an effective area $A_{eff}$ of a spatial mode localized in each core is preferably 75 μm$^2$ to 180 μm$^2$ in all the spatial modes.

(6) As one aspect of the present embodiment, the optical fiber preferably has an average value of 10 ps/km$^{1/2}$ or less, 1 ps/km$^{1/2}$ or less, or 0.1 ps/km$^{1/2}$ or less, when the maximum value of inter-mode differential group delay (DGD) is measured at each wavelength over the wavelength range of 1530 nm to 1565 nm or the wavelength range of 1460 nm to 1625 nm.

(7) As one aspect of the present embodiment, the same number of spatial modes as the number of cores included in the optical fiber are set as propagation modes in descending order of effective refractive indexes. In this case, when the fiber length of the optical fiber is 22 m, in a wavelength range of 1530 nm or more, transmission loss of a spatial mode having the highest effective refractive index out of spatial modes excluding the propagation modes, is preferably greater than the transmission loss of each of the propagation modes by 19.3 dB or more, regardless of a bending state of the optical fiber.

(8) As one aspect of the present embodiment, the optical fiber includes a coupled MCF including a plurality of cores, a common optical cladding covering all of the plurality of cores, and a physical cladding covering the common optical cladding.

As described above, each aspect listed in the "Description of Embodiments of the Present invention" can be applied to all remaining aspects, or to all combinations of the remaining aspects.

Details of Embodiments of the Present Invention

Hereinafter, a detailed structure of the MDL measurement method, the MDL measurement device, and the optical fiber according to the present embodiment will be described in detail with reference to the accompanying drawings. The present invention is not limited to the exemplifications, and it is intended that all modifications are included indicated by the claims, and within a scope and meaning equivalent to the claims. In the description of the drawings, the same elements will be denoted by the same reference signs, without redundant description.

First, a state of light transmission of an optical fiber for mode division multiplexing as the measurement target in the present embodiment will be described below.

When an input complex amplitude of N (≥2) spatial channels (corresponding to N spatial modes) to the optical fiber is a column vector |x⟩ having NM elements including M (≥2) series (time series and wavelength series), an output complex amplitude of the N spatial channels from the optical fiber is a column vector |y⟩, a transfer function of a transmission line including M pieces of time series or wavelength series information is a transfer matrix T of N rows and NM columns, and noise is n, the state of light transmission in the optical fiber can be modeled as the expression (3) as follows:

$$|y\rangle = T|x\rangle + n \qquad (3)$$

The spatial mode in the optical fiber as the measurement target also includes a polarization mode. In a case where the measurement target is a MCF, the spatial mode may be a spatial mode as a core mode of each core, or a spatial mode as an eigenmode of when a whole of a plurality of cores has a waveguide structure (super mode).

At this time, calculation of signal restoration by MIMO processing is calculated by the expression (4) as follows:

$$|x\rangle \cong H|y\rangle \qquad (4).$$

However, if at least T is not a square matrix, T does not have an inverse matrix, so that a matrix corresponding to H is calculated by using Singular Value Decomposition (SVD) or the like (see Non Patent Document 2).

A transfer matrix T of an actual optical fiber cannot be measured directly, so that the transfer matrix T is estimated from |x⟩ and |y⟩. However, the above expression (3) can be thought of as N simultaneous expressions including (N×NM) variables in the transfer matrix T, so that the number of expressions is insufficient and the solution cannot be uniquely determined. For that reason, by using various methods (such as zero-forcing estimation, least squares estimation, minimum norm solution, general/linear minimum mean square error estimation, maximum likelihood estimation, maximum ratio combining, subspace method, and compressed sensing), a plausible solution (estimation matrix) is estimated as the transfer matrix T. Such calculation is not easy, and detection including phase information of light is necessary by using coherent receivers for the N spatial channels.

MDL (transmission loss difference between MIMO transmission channels) of the optical fiber as the measurement target is obtained by singular value decomposition of the transfer matrix T predicted by MIMO processing into a form of the expression (5) below, and a ratio between the maximum value and the minimum value of the squares of the singular values is obtained as an estimated value of the MDL (see Non Patent Document 2). (This value is a linear value, which is usually represented in a decibel value by multiplying a common logarithm of the linear value by ten. If the transfer matrix T is not a predicted matrix but a true value, by singular value decomposition of the transfer matrix T into the form of the expression (5) below, the ratio between the maximum value and the minimum value of the squares of the singular values can be defined as the MDL.). In the expression (5) as follows:

$$T = U\Lambda V^* \qquad (5),$$

the matrices U and V* are unitary matrices of N rows and N columns, and NM rows and NM columns, respectively, and ∧ is a matrix of N rows and NM columns in which a diagonal matrix of N rows and N columns whose diagonal components are singular values is included in the first part (a part including a matrix element (1, 1)) and the remaining matrix elements are zero.

As described above, a complicated model is necessary to consider the transfer matrix of the complex amplitude signal. Therefore, in the present embodiment, considering only the transmission loss of the optical fiber as a transmission medium of a measurement target, a simpler model is adopted.

That is, when powers of input and output of the N spatial channels of the optical fiber as the measurement target are column vectors $|P_{in}\rangle$ and $|P_{out}\rangle$, respectively, and a transfer matrix of N rows and N columns including only transmission loss information in the optical fiber is α, the model can be represented by the expression (6) as follows:

$$|P_{out}\rangle = \alpha |P_{in}\rangle \quad (6)$$

$$\alpha = \begin{pmatrix} \alpha_{11} & \cdots & \alpha_{1i} & \cdots & \alpha_{1N} \\ \vdots & \ddots & \vdots & \ddots & \vdots \\ \alpha_{f1} & \cdots & \alpha_{ji} & \cdots & \alpha_{jN} \\ \vdots & \ddots & \vdots & \ddots & \vdots \\ \alpha_{N1} & \cdots & \alpha_{Ni} & \cdots & \alpha_{NN} \end{pmatrix}.$$

At this time, the transfer matrix α is considered to be an ensemble average of TT*. However, the matrix T' is an adjoint matrix of the matrix T. When <x> represents an ensemble average of x, from the above equation (5), the transfer matrix α is given by the expression (7) as follows:

$$\alpha = \langle TT^* \rangle = \langle U \wedge V^* V \wedge^* U^* \rangle = U \langle \wedge \wedge^* \rangle U^* \quad (7)$$

In the expression (7), $\langle \wedge \wedge^* \rangle$ is a diagonal matrix whose diagonal components are ensemble averages of respective squares of absolute values of individual singular values. For that reason, a ratio obtained by dividing the maximum value of the diagonal elements of $\langle \wedge \wedge^* \rangle$ by the minimum value corresponds to the linear value of the MDL. The above expression (7) corresponds to an expression of eigenvalue decomposition of the transfer matrix α, so that a matrix of N rows and N columns whose as diagonal elements are eigenvalues of the transfer matrix α is $\langle \wedge \wedge^* \rangle$. The transfer matrix α can be easily measured by the MDL measurement method of the present embodiment described above. However, if there is a measurement error, eigenvalue decomposition may not be possible. In such a case, if singular value decomposition is performed, although an error is included, $\langle \wedge \wedge^* \rangle$ can be obtained by the expression (8) as follows:

$$\alpha = U \langle \wedge \wedge^* \rangle W^* \quad (8).$$

Here, W* is a unitary matrix of N rows and N columns different from U.

If it is difficult to perform singular value decomposition, a ratio obtained by dividing the maximum value of elements of $\langle \wedge \wedge^* \rangle$ by the minimum value may be determined as the MDL.

In the following, a configuration will be described of the MDL measurement device according to the present embodiment that enables the MDL measurement described above, with reference to FIGS. 1A, 4A to 4B, and 5A to 5B.

A basic configuration of the MDL measurement device according to the present embodiment is similar to that of a general MDL measurement device 100 illustrated in FIG. 1A. That is, as illustrated in FIG. 1A, the MDL measurement device according to the present embodiment also includes a transmission system 20, a reception system 30, and a control device 40 including a calculation means 50. The control device 40 and the transmission system 20 are connected to each other via a transmission system control line (including a data line) 25, and the control device 40 and the reception system 30 are connected to each other via a reception system control line (including a data line) 35.

Figure 4A:
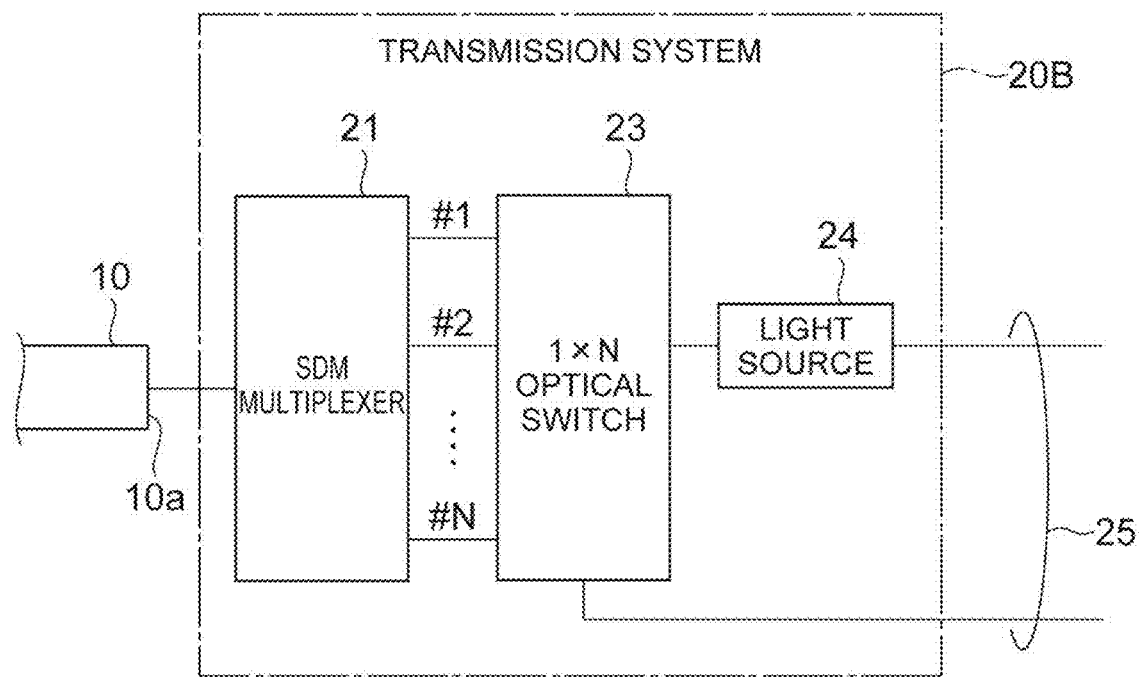
FIG. 4A is a diagram illustrating an example of a schematic configuration of a transmission system applicable to a MDL measurement device according to a present embodiment.

As an example, as illustrated in FIG. 4A, a transmission system 20B in the MDL measurement device according to the present embodiment, which corresponds to the transmission system 20 in FIG. 1A, includes an SDM multiplexer 21, a 1×N optical switch 23, and a light source 24. ON/OFF of the light source 24 is controlled by the control device 40 via the control line 25. The control device 40 controls, via the control line 25, the 1×N optical switch 23 to select a spatial mode as a target of light-input out of the N spatial modes (spatial channels) #1 to #N propagating in an optical fiber 10. In the transmission system 20B, light of the i-th spatial mode selected by the 1×N optical switch 23 is inputted from an input end (first end) 10a via the SDM multiplexer 21 to the optical fiber 10.

Figure 4B:
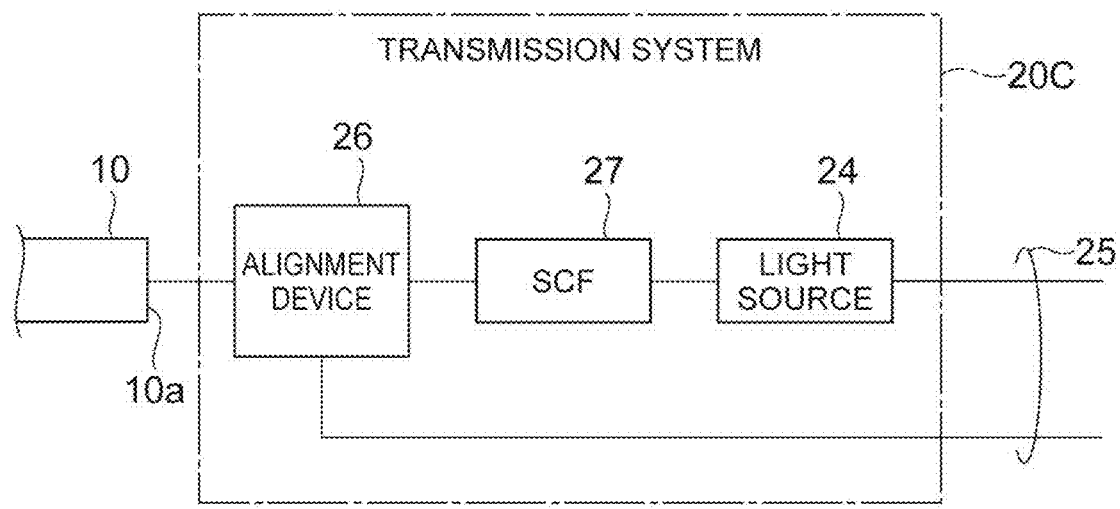
FIG. 4B is a diagram illustrating another example of the schematic configuration of the transmission system applicable to the MDL measurement device according to the present embodiment.

As another example, as illustrated in FIG. 4B, a transmission system 20C in the MDL measurement device according to the present embodiment, which corresponds to the transmission system 20 in FIG. 1A, includes an alignment device 26, a single core optical fiber (hereinafter referred to as "SCF") 27, and the light source 24. The alignment device 26 optically connects a specific core whose end face is positioned on the input end 10a of the optical fiber 10 as the measurement target, and the core of the SCF 27 to each other. The light source 24 is controlled from the control device 40 via the control line 25, and light outputted from the light source 24 is input into the core of the optical fiber 10 connected by the alignment device 26 via the SCF 27.

Figure 5A:
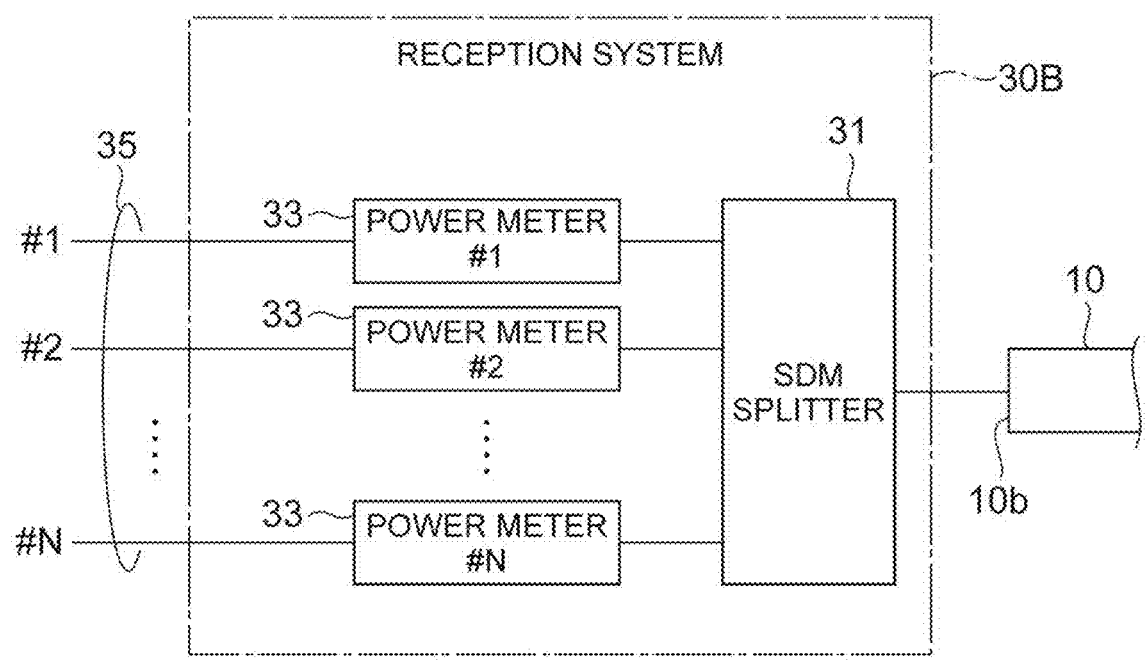
FIG. 5A is a diagram illustrating an example of a schematic configuration of a reception system applicable to the MDL measurement device according to the present embodiment.

Meanwhile, as an example, as illustrated in FIG. 5A, a reception system 30B in the MDL measurement device according to the present embodiment, which corresponds to the reception system 30 in FIG. 1A, includes an SDM splitter 31, and N power meters 33 (power meters #1 to #N) provided to correspond respectively to the N spatial modes #1 to #N propagating in the optical fiber 10. The SDM splitter 31 splits light outputted from an output end (second end) 10b of the optical fiber 10 into light beams of the N spatial modes #1 to #N, and each of the N power meters 33 measures light intensity of a corresponding spatial mode. The control device 40 takes in light intensity information of each of the spatial modes #1 to #N from corresponding one of the N power meters 33 via the control line 35.

Figure 5B:
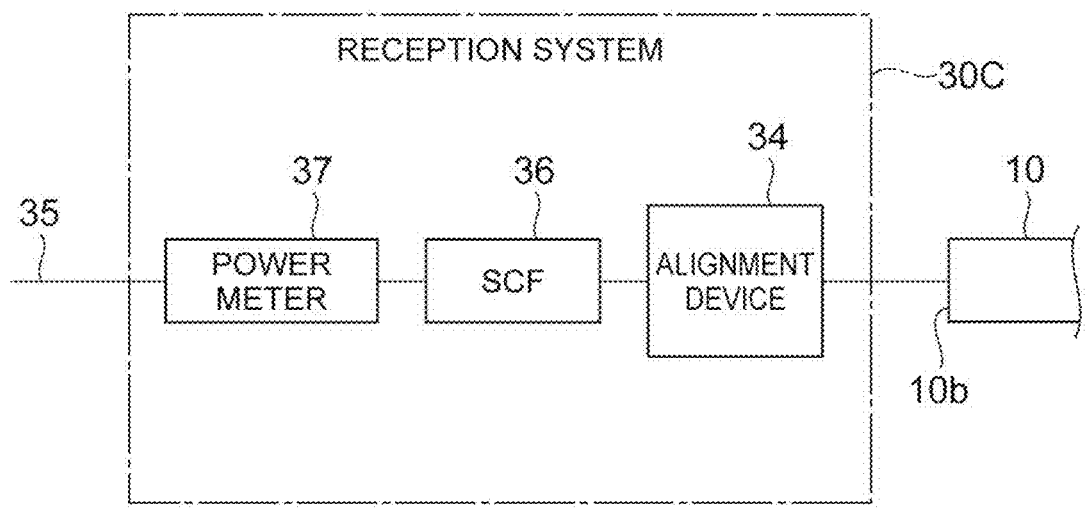
FIG. 5B is a diagram illustrating another example of the schematic configuration of the reception system applicable to the MDL measurement device according to the present embodiment.

As another example, as illustrated in FIG. 5B, a reception system 30C in the MDL measurement device according to the present embodiment, which corresponds to the reception system 30 in FIG. 1A, includes an alignment device 34, an SCF 36, and a power meter 37. The alignment device 34 optically connects a core positioned on the output end 10b of the optical fiber 10, and the core of the SCF 36 to each other, and sequentially guides, to the SCF 36, the light beams of the N spatial modes #1 to #N propagating in the optical fiber 10. The power meter 37 measures light intensity of each of the spatial modes reached via the SCF 36, and sequentially transmits measured light intensity information to the control device 40 via the control line 35.

Figure 6:
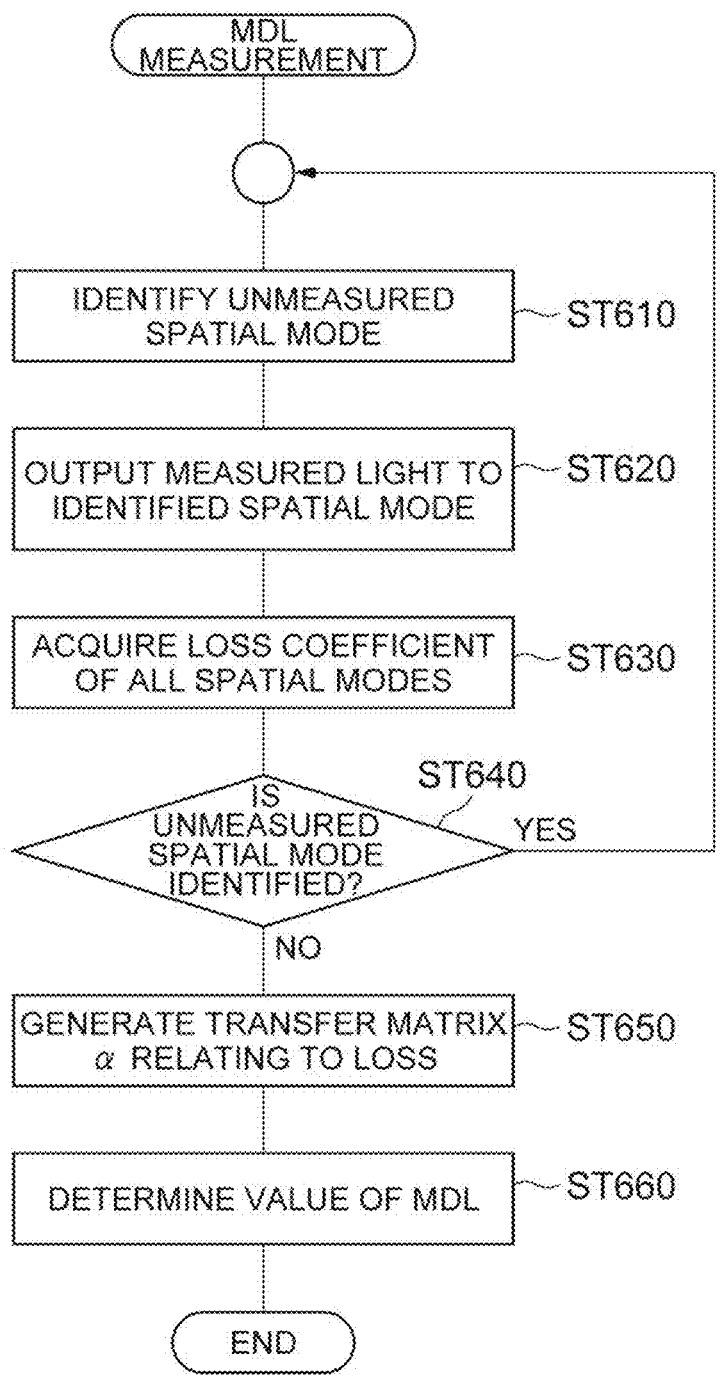
FIG. 6 is a flowchart for explaining a MDL measurement method according to the present embodiment.

FIG. 6 is a flowchart for explaining the MDL measurement method according to the present embodiment. That is, the MDL measurement method according to the present embodiment executes identification of an unmeasured spatial mode (step ST610), measured light output to the identified spatial mode (step ST620), acquisition of a loss coefficient of all the spatial modes (step ST630), for all the spatial modes (step ST640). When steps ST610 to ST630 are completed for all the spatial modes, generation of the transfer matrix α relating to transmission loss of the optical fiber 10 (step ST650), and determination of a value of the MDL (step ST660) are executed. In the following description, FIG. 1A is appropriately referenced.

In step ST610, in the transmission system 20B or 20C, an unmeasured i-th (i=1, 2, . . . , N) spatial mode is identified out of the N spatial modes #1 to #N of the optical fiber 10 as the measurement target. In step ST620, as the light-input operation, the transmission system 20B or 20C inputs the light of the intensity $P_i$, from the input end (first end) 10a of the optical fiber 10 having the fiber length $L_i$ [unit fiber length], to the i-th spatial mode.

In step ST630, in a case where random coupling between the spatial modes #1 to #N occurs and the MDL $[dB/(km)^{1/2}]$ accumulates, as the intensity measurement operation, the reception system 30B or 30C measures intensity of the light of each of the N spatial modes #1 to #N in which the light intensity of the j-th (j=1, 2, . . . , N) spatial mode is represented by $P_{ji}$ [mW], the light being outputted from the output end (second end) 10b of the optical fiber 10 in response to the light-input to the i-th spatial mode. When the light-input operation and the intensity measurement operation are completed for all the spatial modes #1 to #N (step ST640), in step ST650, the calculation means 50 of the control device 40 generates the transfer matrix α given by the above expression (1). In step ST660, the calculation means 50 of the control device 40 determines, as a linear value of the mode-dependent loss per unit fiber length, a ratio obtained by dividing the maximum value of matrix elements constituting the transfer matrix α by the minimum value of the matrix elements, or a ratio obtained by dividing the maximum value of eigenvalues or singular values of the transfer matrix α by the minimum value of the eigenvalues or the singular values, and determines the decibel value of the MDL $[dB/(unit\ fiber\ length)^{1/2}]$ by multiplying the common logarithm of the obtained linear value by ten.

In the MDL measurement without a cutback as described above, influence of variation in connection loss at the input end 10a appears in the light intensity $P_{ji}$ [mW] of the j-th spatial mode measured in response to the light-input to the i-th spatial mode. In this case, a configuration is preferable that eliminates the influence of variation in connection loss in the MDL measurement, by the cutback. Specifically, in the light-input operation in step ST620, the light of the intensity $P_i$ is inputted, from the input end 10a of the optical fiber 10 having the fiber length $L_i$ [unit fiber length], to the i-th spatial mode. In the intensity measurement operation in step ST630, the first operation of measuring the intensity before the cutback, and the second operation of measuring the intensity after the cutback are performed. That is, in the first operation, the intensity is measured of the light of each of the N spatial modes in which the light intensity of the j-th spatial mode is represented by $P_{ji}$ [mW], the light being outputted from the output end 10b in response to the light-input to the i-th spatial mode. In the second operation, first, the cutback part is obtained having the input end 10a and the cutback length $L_i'$ ($<L_i$) [unit fiber length], obtained by cutting the optical fiber 10 at the position of 1 [m] to 50 [m] from the input end 10a while leaving the input end (first end) 10a. In the second operation, in response to the light-input operation to the i-th spatial mode, the light intensity $P_i'$ [mW] is measured of the i-th spatial mode outputted from the output end (third end) 10c opposite to the input end 10a of the obtained cutback part. When a combination of the first operation of the light-input operation and the intensity measurement operation, and a combination of the second operation of the light-input operation and the intensity measurement operation are completed for all the spatial modes #1 to #N (step ST640), in step ST650, the calculation means 50 of the control device 40 generates the transfer matrix α given by the above expression (2). In step ST660, the calculation means 50 of the control device 40 determines, as a linear value of the mode-dependent loss per unit fiber length, a ratio obtained by dividing the maximum value of matrix elements constituting the transfer matrix α by the minimum value of the matrix elements, or a ratio obtained by dividing the maximum value of eigenvalues or singular values of the transfer matrix α by the minimum value of the eigenvalues or the singular values, and determines the decibel value of the MDL $[dB/(unit\ fiber\ length)^{1/2}]$ by multiplying the common logarithm of the obtained linear value by ten.

According to the above Non Patent Document 2, the MDL in an optical fiber for mode division multiplex transmission in which crosstalk (hereinafter referred to as "XT") between the spatial modes is large that has been reported so far, that is, the MDL in a coupled MCF varies for each graph, but is approximately 0.06 $dB/km^{1/2}$ to 0.14 $dB/km^{1/2}$. According to the above Non Patent Document 1, it is known that when the MDL is large, the transmission capacity degrades during the mode division multiplex transmission in the MIMO configuration.

From the above, as in the embodiment, in the optical fiber 10 capable of optical transmission in the spatial mode in which XT is large, the MDL measured by the MDL measurement method according to the present embodiment is preferably 0.02 $dB/km^{1/2}$ or less in the wavelength range of 1530 nm to 1565 nm or the wavelength range of 1460 nm to 1625 nm that are suitable for long distance transmission. In this case, it is possible to maximize the capacity of a long distance transmission system using, as a transmission line, the optical fiber for mode division multiplex transmission in which XT between spatial modes is large. Further, the MDL of the optical fiber 10 is preferably 0.01 $dB/km^{1/2}$ or less, further, 0.005 $dB/km^{1/2}$ or less, further 0.002 $dB/km^{1/2}$ or less, and further preferably 0.001 $dB/km^{1/2}$ or less.

The average value of the MDL in the wavelength range of 1530 nm to 1565 nm or the wavelength range of 1460 nm to 1625 nm is 0.01 $dB/km^{1/2}$ or less, preferably 0.005 $dB/km^{1/2}$ or less, more preferably 0.002 $dB/km^{1/2}$ or less, and further preferably 0.001 $dB/km^{1/2}$ or less. In order for the optical fiber 10 to have optical properties suitable for long distance transmission, the mode coupling coefficient is preferably 1 [$m^{-1}$] to 100 [$m^{-1}$] at the wavelength of 1550 nm. From a viewpoint of reducing noise caused by optical amplification, from a viewpoint of widening an amplifier interval, or from a viewpoint of extending a transmission distance in a non-relay (no amplifier in a transmission line) transmission system, the transmission loss at all mode excitation is preferably 0.020 dB/km or less, more preferably 0.018 dB/km or less, further 0.16 dB/km or less, and further preferably 0.15 dB/km or less in the wavelength range of 1530 nm to 1565 nm or the wavelength range of 1460 nm to 1625 nm. To suppress nonlinear noise, the mode average of chromatic dispersion is preferably 16 ps/(nm·km) or more. Further, from a viewpoint of nonlinear noise suppression, or from a viewpoint of suppressing macro loss and microbending loss increase due to excessive effective area expansion, under external stress application, the effective area $A_{eff}$ of the spatial mode localized in each core is preferably 75 µm² to 180 µm² in all the spatial modes. From a viewpoint of suppression of loss increase due to bending of the optical fiber in a repeater or a station building, with respect to the light with the wavelength of 1550 nm of all the spatial modes, the bending loss is preferably 0.2 dB or less when the optical fiber is wound one turn around the mandrel having the diameter of 30 mm. With respect to the light with the wavelength of 1550 nm of all the spatial modes, bending loss at a diameter of 20 mm is preferably 20 dB/m or less. With respect to the light with the wavelength of 1550 nm of all the spatial modes, bending loss is preferably 0.5 dB or less when the optical fiber is wound 100 turns around a mandrel having a radius of 30 mm.

From a viewpoint of reducing a calculation load of MIMO processing, the optical fiber 10 preferably has an average value of 10 ps/km$^{1/2}$ or less, 1 ps/km$^{1/2}$ or less, or 0.1 ps/km$^{1/2}$ or less, when the maximum value of the inter-mode DGD is measured at each wavelength over the wavelength range of 1530 nm to 1565 nm or the wavelength range of 1460 nm to 1625 nm.

The same number of spatial modes as the number of cores included in the optical fiber are set as propagation modes in descending order of effective refractive indexes. In this case, when the fiber length of the optical fiber is 22 m, in a wavelength range of 1530 nm or more, transmission loss of a spatial mode having the highest effective refractive index out of spatial modes excluding the propagation modes, is preferably greater than the transmission loss of each of the propagation modes by 19.3 dB or more, regardless of a bending state of the optical fiber.

Figure 1B:
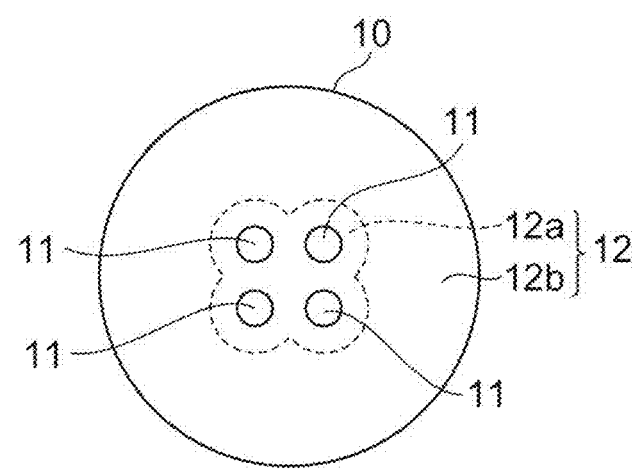
FIG. 1B is a diagram illustrating a cross-sectional structure of a coupled MCF.
Figure 2A:
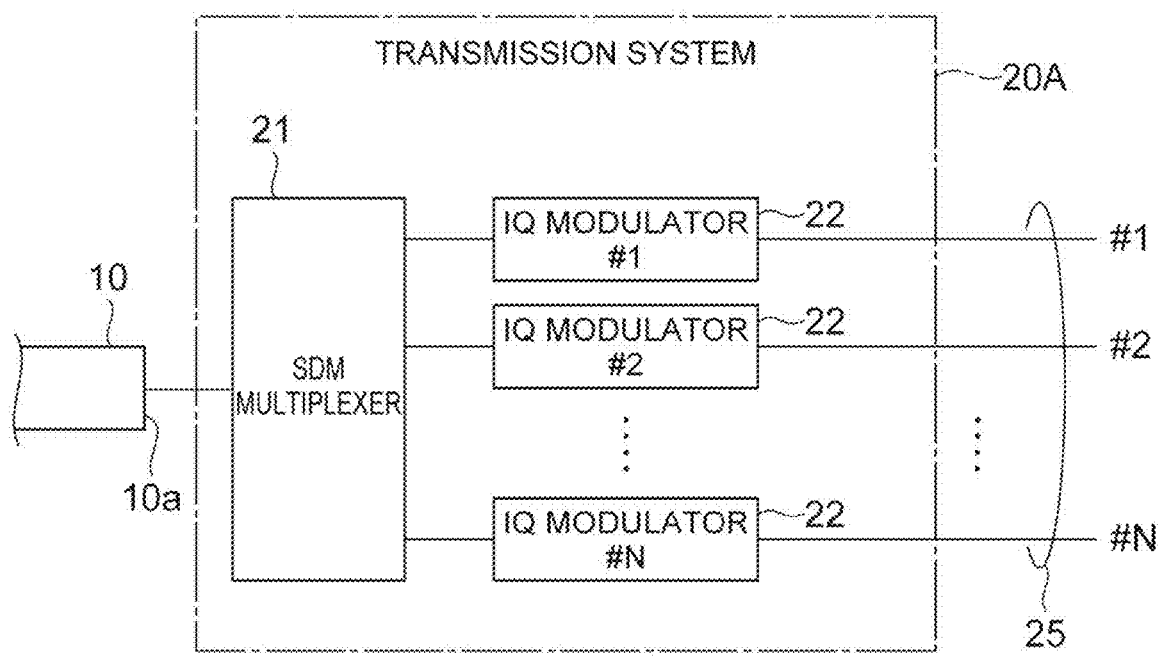
FIG. 2A is a diagram illustrating a schematic configuration of a transmission system in a conventional MDL measurement device.
Figure 2B:
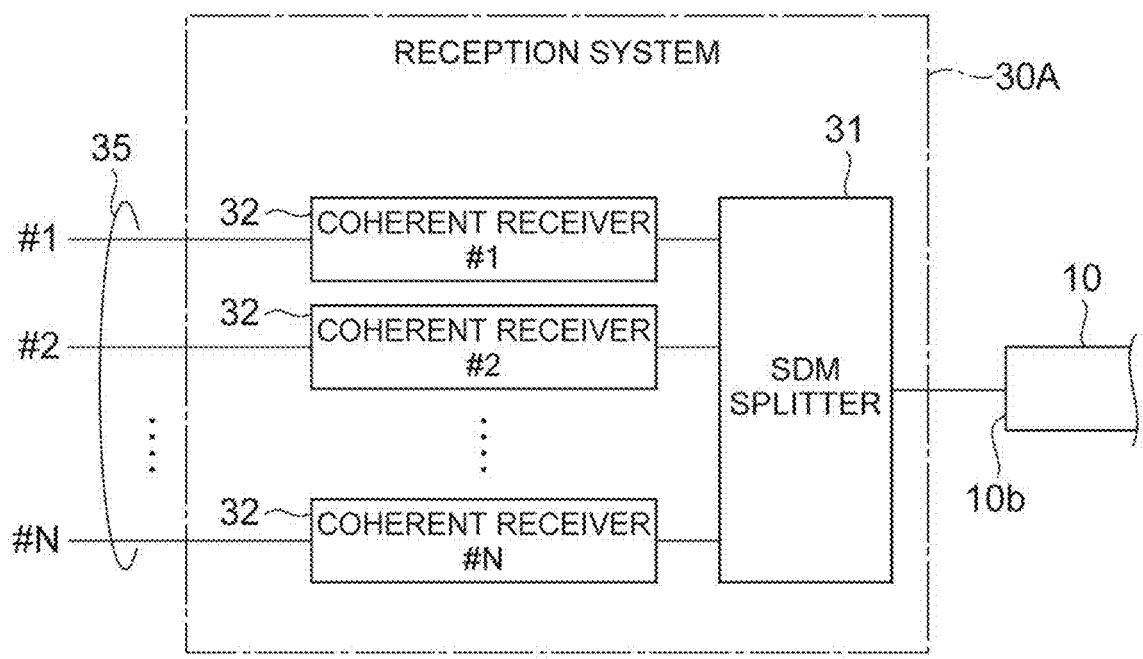
FIG. 2B is a diagram illustrating a schematic configuration of a reception system in the conventional MDL measurement device.
Figure 3:
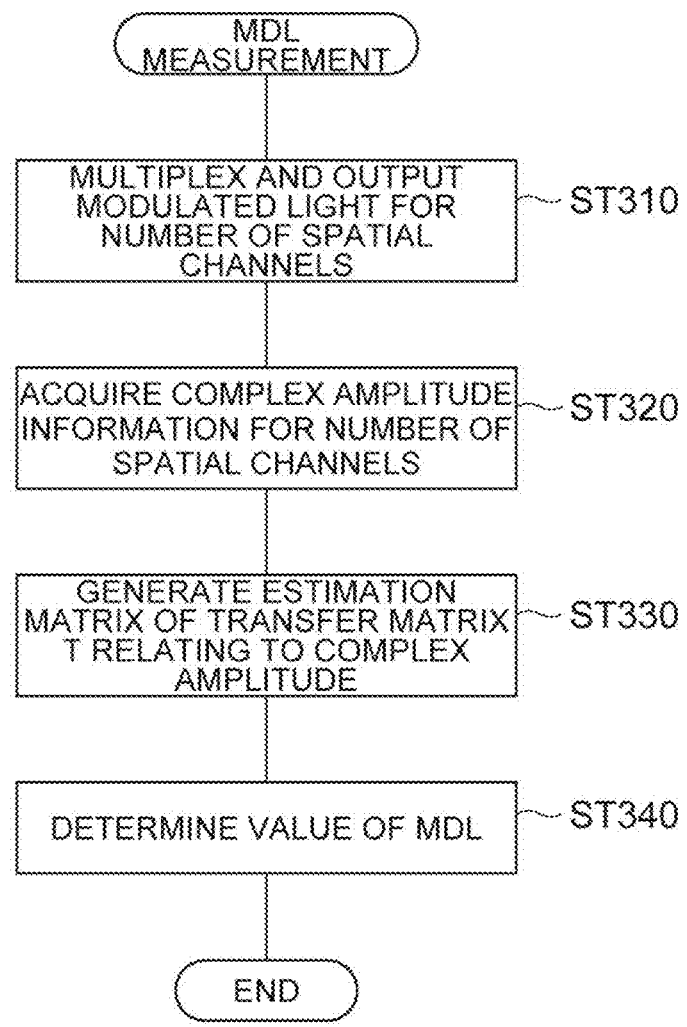
FIG. 3 is a flowchart for explaining a conventional MDL measurement method.

From a viewpoint of manufacturing efficiency improvement, as illustrated in FIG. 1B, the optical fiber 10 includes a coupled MCF including a plurality of cores 11, a common optical cladding 12a covering all of the plurality of cores 11, and a physical cladding 12b covering the common optical cladding 12a. Here, the optical cladding 12a is a part of a cladding 12 contributing to optical transmission, and the physical cladding 12b is a part of the cladding 12 not contributing to optical transmission. From a viewpoint of consistency with a conventional cabling technology, a cladding diameter of the optical fiber 10 is desirably 124 µm to 126 µm. In addition, from the viewpoint of consistency with the conventional cabling technology, a covering diameter of the optical fiber 10 is desirably 240 µm to 260 µm.

REFERENCE SIGNS LIST

10 . . . Optical fiber (measurement target); 20, 20B, 20C . . . Transmission system; 25 . . . Transmission system control line; 30, 30B, 30C . . . Reception system; 35 . . . Reception system control line (including data line); 40 . . . Control device; 50 . . . Calculation means; and 100 . . . MDL measurement device.

The invention claimed is:

1. A mode-dependent loss measurement method for measuring mode-dependent loss of an optical fiber having a first end and a second end opposite to the first end and enabling optical transmission in N spatial modes between which mutual crosstalk occurs, N being equal to or greater than 2, the mode-dependent loss measurement method comprising:

repeating, for each respective target spatial mode of the N spatial modes light-input operation and intensity measurement operation to generate a transfer matrix including only transmission loss information in the optical fiber from the first end to the second end, the light-input operation inputting light of a predetermined intensity from the first end of the optical fiber to the respective target spatial mode, the intensity measurement operation measuring an intensity of light in each of the N spatial modes including the respective target spatial mode, the light being outputted from the second end of the optical fiber in response to light-input to the respective target spatial mode; and determining, as a linear value of mode-dependent loss per unit fiber length, a ratio obtained by dividing a maximum value of matrix elements constituting the transfer matrix by a minimum value of the matrix elements, or a ratio obtained by dividing a maximum value of eigenvalues or singular values of the transfer matrix by a minimum value of the eigenvalues or the singular values.

2. The mode-dependent loss measurement method according to claim 1, further comprising:

multiplying a common logarithm of the linear value by ten to determine a decibel value of the mode-dependent loss per unit fiber length.

3. The mode-dependent loss measurement method according to claim 1, wherein the light-input operation includes operation of inputting light of an intensity $P_i$, from the first end of the optical fiber having a fiber length $L_i$ [unit fiber length], to an i-th (i=1, 2, . . . , N) spatial mode as the target spatial mode out of the N spatial modes, the intensity measurement operation includes operation of measuring an intensity of light in each of the N spatial modes in which a light intensity of an j-th (j=1, 2, . . . , N) spatial mode is represented by $P_{ji}$, [mW], the light being outputted from the second end of the optical fiber in response to light-input to the i-th spatial mode, and the method repeats the light-input operation and the intensity measurement operation for each of the N spatial modes while changing the target spatial mode, to generate a transfer matrix relating to the transmission loss represented by an expression (1) as follows:

$$\begin{pmatrix} \left(\frac{P_{11}}{P_1}\right)^{\sqrt{\frac{1}{L_i}}} & \cdots & \left(\frac{P_{1i}}{P_i}\right)^{\sqrt{\frac{1}{L_i}}} & \cdots & \left(\frac{P_{1N}}{P_N}\right)^{\sqrt{\frac{1}{L_N}}} \\ \vdots & \ddots & \vdots & \ddots & \vdots \\ \left(\frac{P_{j1}}{P_1}\right)^{\sqrt{\frac{1}{L_i}}} & \cdots & \left(\frac{P_{ji}}{P_i}\right)^{\sqrt{\frac{1}{L_i}}} & \cdots & \left(\frac{P_{jN}}{P_N}\right)^{\sqrt{\frac{1}{L_N}}} \\ \vdots & \ddots & \vdots & \ddots & \vdots \\ \left(\frac{P_{N1}}{P_1}\right)^{\sqrt{\frac{1}{L_i}}} & \cdots & \left(\frac{P_{Ni}}{P_i}\right)^{\sqrt{\frac{1}{L_i}}} & \cdots & \left(\frac{P_{NN}}{P_N}\right)^{\sqrt{\frac{1}{L_N}}} \end{pmatrix}. \quad (1)$$

4. The mode-dependent loss measurement method according to claim 3, wherein the light-input operation includes operation of inputting light of an intensity $P_i$, [mW], from the first end of the optical fiber having a fiber length $L_i$, [unit fiber length], to an i-th (i=1, 2, . . . , N) spatial mode as the target spatial mode out of the N spatial modes, the intensity measurement operation includes:

first operation of measuring an intensity of light in each of the N spatial modes in which a light intensity of an j-th (j=1, 2, ..., N) spatial mode is represented by $P_{ji}$ [mW], the light being outputted from the second end of the optical fiber in response to light-input to the i-th spatial mode; and second operation of preparing a cutback part having the first end and a cutback length $L_i'$ (<$L_i$) [unit fiber length], obtained by culling the optical fiber at a position of 1 [m] to 50 [m] from the first end while leaving the first end, and measuring a light intensity $P_i'$ [mW] of the i-th spatial mode outputted from a third end opposite to the first end of the cutback part in response to light-input to the i-th spatial mode, and the method repeats the light-input operation and the intensity measurement operation for each of the N spatial modes while changing the target spatial mode, to generate a transfer matrix relating to the transmission loss represented by an expression (2) as follows:

$$\begin{pmatrix} \left(\frac{P_{11}}{P_1'}\right)^{\sqrt{\frac{1}{L_i}}} & \cdots & \left(\frac{P_{1i}}{P_i'}\right)^{\sqrt{\frac{1}{L_i}}} & \cdots & \left(\frac{P_{1N}}{P_N'}\right)^{\sqrt{\frac{1}{L_N}}} \\ \vdots & \ddots & \vdots & \ddots & \vdots \\ \left(\frac{P_{j1}}{P_1'}\right)^{\sqrt{\frac{1}{L_i}}} & \cdots & \left(\frac{P_{ji}}{P_i'}\right)^{\sqrt{\frac{1}{L_i}}} & \cdots & \left(\frac{P_{jN}}{P_N'}\right)^{\sqrt{\frac{1}{L_N}}} \\ \vdots & \ddots & \vdots & \ddots & \vdots \\ \left(\frac{P_{N1}}{P_1'}\right)^{\sqrt{\frac{1}{L_i}}} & \cdots & \left(\frac{P_{Ni}}{P_i'}\right)^{\sqrt{\frac{1}{L_i}}} & \cdots & \left(\frac{P_{NN}}{P_N'}\right)^{\sqrt{\frac{1}{L_N}}} \end{pmatrix}. \quad (2)$$

5. The mode-dependent loss measurement method according to claim 3, further comprising:

multiplying a common logarithm of the linear value by ten to determine a decibel value of the mode-dependent loss per unit fiber length.

6. The mode-dependent loss measurement method according to claim 1, wherein the light-input operation includes operation of inputting light of an intensity $P_i$, from the first end of the optical fiber having a fiber length $L_i$ [unit fiber length], to an i-th (i=1, 2, ..., N) spatial mode as the target spatial mode out of the N spatial modes, the intensity measurement operation includes:

first operation of measuring an intensity of light in each of the N spatial modes in which a light intensity of an j-th (j=1, 2, ..., N) spatial mode is represented by $P_{ji}$, the light being outputted from the second end of the optical fiber in response to light-input to the i-th spatial mode; and second operation of preparing a cutback part having the first end and a cutback length $L_i'$ (<$L_i$) [unit fiber length], obtained by cutting the optical fiber at a position of 1 [m] to 50 [m] from the first end while leaving the first end, and measuring a light intensity $P_i'$ [mW] of the i-th spatial mode outputted from a third end opposite to the first end of the cutback part in response to light-input to the i-th spatial mode, and the method repeats the light-input operation and the intensity measurement operation for each of the N spatial modes while changing the target spatial mode, to generate a transfer matrix relating to the transmission loss represented by an expression (2) as follows:

$$\begin{pmatrix} \left(\frac{P_{11}}{P_1'}\right)^{\sqrt{\frac{1}{L_i}}} & \cdots & \left(\frac{P_{1i}}{P_i'}\right)^{\sqrt{\frac{1}{L_i}}} & \cdots & \left(\frac{P_{1N}}{P_N'}\right)^{\sqrt{\frac{1}{L_N}}} \\ \vdots & \ddots & \vdots & \ddots & \vdots \\ \left(\frac{P_{j1}}{P_1'}\right)^{\sqrt{\frac{1}{L_i}}} & \cdots & \left(\frac{P_{ji}}{P_i'}\right)^{\sqrt{\frac{1}{L_i}}} & \cdots & \left(\frac{P_{jN}}{P_N'}\right)^{\sqrt{\frac{1}{L_N}}} \\ \vdots & \ddots & \vdots & \ddots & \vdots \\ \left(\frac{P_{N1}}{P_1'}\right)^{\sqrt{\frac{1}{L_i}}} & \cdots & \left(\frac{P_{Ni}}{P_i'}\right)^{\sqrt{\frac{1}{L_i}}} & \cdots & \left(\frac{P_{NN}}{P_N'}\right)^{\sqrt{\frac{1}{L_N}}} \end{pmatrix}. \quad (2)$$

7. An optical fiber, wherein, in a wavelength range of 1530 nm to 1565 nm or a wavelength range of 1460 nm to 1625 nm, mode-dependent loss measured by the mode-dependent loss measurement method according to claim 1 is 0.02 dB/km$^{1/2}$ or less, or an average value of the mode-dependent loss is 0.01 dB/km$^{1/2}$ or less.

8. The optical fiber according to claim 7, wherein the optical fiber is a multi-core optical fiber having optical properties in which:

a mode coupling coefficient is 1 [m$^{-1}$] to 100 [m$^{-1}$] at a wavelength of 1550 nm;

transmission loss at all mode excitation is 0.20 dB/km or less, 0.18 dB/km or less, 0.16 dB/km or less, or 0.15 dB/km or less, in the wavelength range of 1530 nm to 1565 nm or the wavelength range of 1460 nm to 1625 nm;

a mode average of chromatic dispersion is 16 ps/(nm·km) or more;

bending loss is 0.2 dB or less when the optical fiber is wound one turn around a mandrel having a diameter of 30 mm, with respect to light with a wavelength of 1550 nm of all spatial modes;

bending loss is 20 dB/m or less at diameter of 20 mm, with respect to the light with the wavelength of 1550 nm of all the spatial modes;

bending loss is 0.5 dB or less when the optical fiber is wound 100 turns around a mandrel having a radius of 30 mm, with respect to the light with the wavelength of 1550 nm of all the spatial modes, and an effective area $A_{eff}$ of a spatial mode localized in each core is 75 μm$^2$ to 180 μm$^2$ in all the spatial modes, under external stress application.

9. The optical fiber according to claim 7, wherein an average value of a maximum value of an inter-mode differential group delay is 10 ps/km$^{1/2}$ or less, 1 ps/km$^{1/2}$ or less, or 0.1 ps/km$^{1/2}$ or less, the inter-mode differential group delay being measured at each wavelength over the wavelength range of 1530 nm to 1565 nm or the wavelength range of 1460 nm to 1625 nm.

10. The optical fiber according to claim 7, wherein the optical fiber has propagation modes among the spatial modes in descending order of effective refractive indexes of the spatial modes, the number of the propagation modes being equal to the number of cores included in the optical fiber, and in a wavelength range of 1530 nm or more, transmission loss of a spatial mode having the highest effective refractive index out of spatial modes excluding the propagation modes, is greater than the transmission loss of each of the propagation modes by 19.3 dB or more, regardless of a bending state of the optical fiber, the transmission loss being measured on a 22 m length of the optical fiber.

11. The optical fiber according to claim 7, wherein
the optical fiber is a multi-core optical fiber including a plurality of cores, a common optical cladding covering all of the plurality of cores, and a physical cladding covering the common optical cladding.

* * * * *